(12) United States Patent
Okada et al.

(10) Patent No.: US 10,821,780 B2
(45) Date of Patent: Nov. 3, 2020

(54) TIRE

(71) Applicant: Sumitomo Rubber Industries, Ltd., Kobe-shi, Hyogo (JP)

(72) Inventors: Takashi Okada, Kobe (JP); Yoshifumi Kawagoe, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 301 days.

(21) Appl. No.: 15/808,225

(22) Filed: Nov. 9, 2017

(65) Prior Publication Data

US 2018/0134087 A1    May 17, 2018

(30) Foreign Application Priority Data

Nov. 11, 2016 (JP) ................................ 2016-220890
Nov. 11, 2016 (JP) ................................ 2016-220891

(51) Int. Cl.
*B60C 11/03* (2006.01)
*B60C 11/13* (2006.01)

(52) U.S. Cl.
CPC ......... *B60C 11/0302* (2013.01); *B60C 11/032* (2013.01); *B60C 11/1323* (2013.01);
(Continued)

(58) Field of Classification Search
CPC ......... B60C 11/0302; B60C 2011/0355; B60C 2011/0381; B60C 2011/0372;
(Continued)

(56) References Cited

U.S. PATENT DOCUMENTS

2009/0114323 A1* 5/2009 Yamane .............. B60C 11/0309
152/209.18
2012/0261045 A1 10/2012 Matsushita
(Continued)

FOREIGN PATENT DOCUMENTS

EP       2631087 A1    8/2013
JP     2008-168703 A   7/2008
(Continued)

OTHER PUBLICATIONS

Extended European Search Report, dated Apr. 25, 2018, for European Application No. 17200446.7.

*Primary Examiner* — Alison L Hindenlang
*Assistant Examiner* — Olukorede Esan
(74) *Attorney, Agent, or Firm* — Birch, Stewart, Kolasch & Birch LLP

(57) ABSTRACT

A tire 1 includes shoulder regions 4 each provided with first lateral grooves 7 and second lateral grooves 8. Each of the first lateral grooves 7 includes an inner portion 11 that extends axially outwardly from an inner end (7i) arranged axially outside a crown main groove 3 with a space therebetween and obliquely at an angle θ1 with respect to the tire axial direction, and an outer portion 12 that extends obliquely at an angle θ2 smaller than the angle θ1 with respect to the tire axial direction so as to cross a tread edge (Te). Each of the second lateral grooves 8 is arranged between adjacent first lateral grooves and extends axially outwardly from an inner end (8i) thereof arranged axially outside the crown main groove and obliquely in the same direction as the first lateral grooves 7 so as to terminate without reaching the tread edge (Te).

19 Claims, 4 Drawing Sheets

(52) U.S. Cl.
CPC ............... *B60C 2011/0341* (2013.01); *B60C 2011/0355* (2013.01); *B60C 2011/0358* (2013.01); *B60C 2011/0369* (2013.01); *B60C 2011/0372* (2013.01); *B60C 2011/0374* (2013.01); *B60C 2011/0381* (2013.01); *B60C 2011/0388* (2013.01); *B60C 2200/04* (2013.01)

(58) Field of Classification Search
CPC ......... B60C 2011/0388; B60C 2200/04; B60C 2011/0358; B60C 2011/0374; B60C 11/03; B60C 11/12; B60C 11/04; B60C 11/1369; B60C 11/1392; B60C 11/032; B60C 11/1323; B60C 11/1307; B60C 2011/0341; B60C 2011/0369
See application file for complete search history.

(56) References Cited

U.S. PATENT DOCUMENTS

| | | | | |
|---|---|---|---|---|
| 2012/0312437 A1* | 12/2012 | Harada | ............... | B60C 11/0302 152/209.8 |
| 2013/0220499 A1* | 8/2013 | Sanae | ............... | B60C 11/1392 152/209.18 |
| 2014/0102608 A1* | 4/2014 | Kato | ............... | B60C 11/0304 152/209.8 |
| 2016/0303918 A1* | 10/2016 | Hayashi | ............... | B60C 11/1323 |

FOREIGN PATENT DOCUMENTS

| | | | | |
|---|---|---|---|---|
| JP | 2009-101785 A | | 5/2009 | |
| JP | 2015-131603 A | | 7/2015 | |
| WO | WO 2015107973 | * | 7/2015 | ......... B60C 11/1323 |

\* cited by examiner

TIRE

TECHNICAL FIELD

The present invention relates to a tire having improved drainage performance and steering stability in a good balance.

BACKGROUND ART

As shown in FIG. 4, there has been known a tire (t) having a tread portion (g) provided with a pair of main grooves (a) extending continuously in a tire circumferential direction, oblique grooves (b1) connecting between one of the main grooves (a) and its adjacent one of tread edges (Te) and extending obliquely with respect to a tire axial direction, and oblique grooves (b2) extending obliquely without being connected with the main grooves (a) and the tread edges (Te).

The tire configured as such smoothly discharge water film between a tread surface thereof and a road surface by the main grooves (a) and the oblique grooves (b1) and (b2), therefore, it is possible that excellent discharge performance is exerted.

However, in this type of tire (t), acute-angled first corner portions (c1) are formed between the main grooves (a) and the oblique grooves (b1) in a land region (c). Further, if bent portions (d) as shown in FIG. 4 are provided in the oblique grooves (b2), acute-angled second corner portions (c2) are formed at the bent portions (d) in the land region (c). At the first corner portions (c1) and the second corner portions (c2) configured as such, rubber is likely to accumulate during tire vulcanization. Thereby, in the tire (t) having the first corner portions (c1) and the second corner portions (c2), ground contact pressure becomes uneven, therefore, it is possible that the steering stability tends to deteriorate.

SUMMARY OF THE INVENTION

The present invention was made in view of the above, and a primary object thereof is to provide a tire capable of improving the drainage performance and the steering stability in a good balance.

In one aspect of the present invention, a tire comprises a tread portion comprising a pair of crown main grooves extending continuously in a tire circumferential direction, a pair of shoulder regions defined as regions of the tread portion positioned axially outside the respective crown main grooves, and a plurality of lateral grooves provided in the shoulder regions, wherein the lateral grooves include a plurality of first lateral grooves and a plurality of second lateral grooves, each of the first lateral grooves has an inner end arranged axially outside adjacent one of the crown main grooves with a space therebetween, and comprises an inner portion extending axially outwardly from the inner end and obliquely at an angle $\theta 1$ with respect to the tire axial direction, and an outer portion extending obliquely at an angle $\theta 2$ smaller than the angle $\theta 1$ with respect to the tire axial direction so as to cross adjacent one of tread edges, and each of the second lateral grooves is arranged between the circumferentially adjacent first lateral grooves with an inner end thereof arranged axially outside the adjacent one of the crown main grooves and extends axially and obliquely in the same direction as the first lateral groove so as to terminate without reaching the adjacent one of the tread edges.

In another aspect of the invention, it is preferred that a distance (A) in the tire axial direction between the inner end of the first lateral groove and the adjacent one of the crown main grooves is in a range of from 15% to 35% of a width of either one of the shoulder regions in the tire axial direction.

In another aspect of the invention, it is preferred that the inner end of the second lateral groove is positioned axially outside the adjacent one of the crown main grooves with an axial distance (B) smaller than the axial distance (A) between the inner end of the first lateral groove and the adjacent one of the crown main grooves.

In another aspect of the invention, it is preferred that the first lateral groove has a larger axial length at a tread surface than that of the second lateral groove.

In another aspect of the invention, it is preferred that the second lateral groove is inclined at an angle $\theta 3$ larger than the angle $\theta 1$ with respect to the tire axial direction.

In another aspect of the invention, it is preferred that a length in the tire axial direction of the second lateral groove at a tread surface is in a range of from 40% to 58% of the width of either one of the shoulder region.

In another aspect of the invention, it is preferred that each of the shoulder regions is provided with a plurality of third lateral grooves having a smaller axial length at the tread surface than that of the second lateral groove, and each of the third lateral grooves is arranged between the circumferentially adjacent first lateral grooves with an inner end thereof arranged axially outside the second lateral groove adjacent thereto with a distance (C) therebetween and extends in the tire axial direction so as to cross adjacent one of the tread edges.

In another aspect of the invention, it is preferred that the distance (C) is in a range of from 10% to 25% of a tread width.

In another aspect of the invention, it is preferred that each of the third lateral grooves is inclined to the same direction as the first lateral groove at an angle $\theta 4$ smaller than the angle $\theta 2$ of the outer portion with respect to the tire axial direction.

In another aspect of the invention, it is preferred that the angle $\theta 4$ of the third lateral groove with respect to the tire axial direction is smaller than the angle $\theta 3$ of the second lateral groove with respect to the tire axial direction.

In another aspect of the invention, it is preferred that the angle $\theta 1$ of the inner portion is in a range of from 25 to 45 degrees, the angle $\theta 2$ of the outer portion is in a range of from 15 to 40 degrees, the angle $\theta 3$ of the second lateral groove is in a range of from 30 to 50 degrees, and the angle $\theta 4$ of the third lateral groove is not greater than 25 degrees.

In another aspect of the invention, it is preferred that each of the first lateral grooves, the second lateral grooves, and the third lateral grooves has a groove edge including a plurality of groove edge minute portions, and in a plan view of the tread surface, an angle between any pair of the groove edge minute portions adjacent to each other is not smaller than 90 degrees.

In another aspect of the invention, it is preferred that the read portion further comprises a crown land region defined between the pair of the crown main grooves, and a width in the tire axial direction of the crown land region is in a range of from 10% to 20% of a tread width.

In another aspect of the invention, it is preferred that an angle between the inner portion and the outer portion of each of the first lateral grooves is in a range of from 160 to 170 degrees.

DESCRIPTION OF THE PREFERRED EMBODIMENT

An embodiment of the present invention will now be described in conjunction with accompanying drawings.

Figure 1:
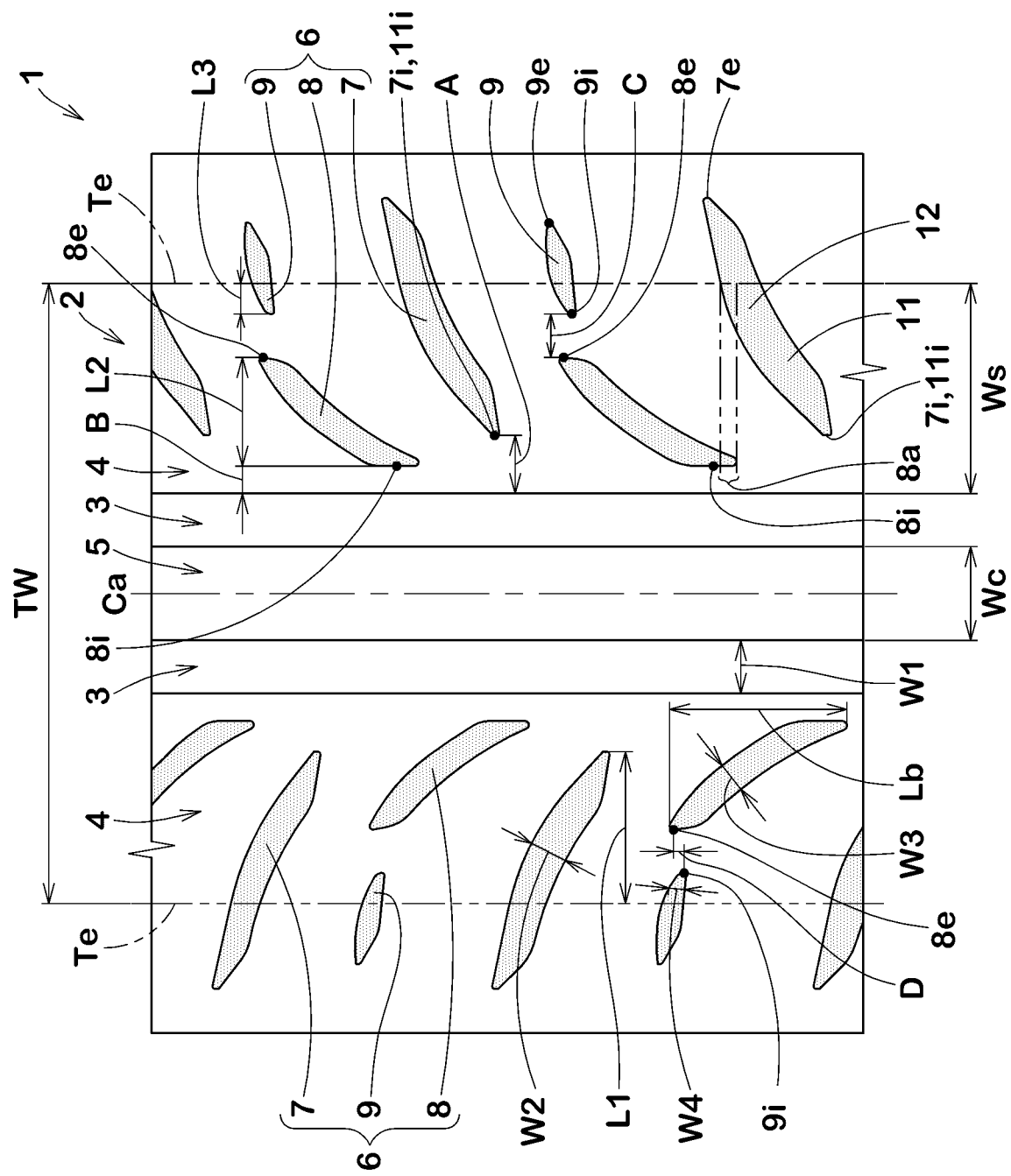
FIG. 1 is a development view of a tread portion of a tire according to an embodiment of the present invention.

FIG. 1 is a developed view of a tread portion 2 of a tire 1 showing an embodiment of the present invention. As a preferred embodiment, the tire 1 in this embodiment is shown as a pneumatic tire for a passenger car. The present invention can be used for other categories of tires such as a pneumatic tire for heavy duty and a non-pneumatic tire not filled with air, for example.

As shown in FIG. 1, the tread portion 2 is provided with a pair of crown main grooves 3 extending continuously in the tire circumferential direction. Thereby, the tread portion 2 is provided with a pair of shoulder regions 4 positioned on both sides of the pair of the crown main grooves 3 and a crown region 5 defined between the pair of the crown main grooves 3.

The crown main grooves 3 in this embodiment extend straight. The crown main grooves 3 configured as such decrease resistance to water passing through the grooves, therefore, high drainage performance is exerted. Note that the crown main grooves 3 are not limited to such an configuration, and they may be configured to extend in a gentle wave shape or a zigzag shape. Further, it is preferred that the pair of the crown main grooves 3 is arranged symmetrically with respect to a tire equator (Ca).

It is preferred that groove widths w1 of the crown main grooves 3 are, for example, in a range of from 5% to 15% of a tread width TW. It is preferred that groove depths (not shown) of the crown main grooves 3 are in about a range of from 5 to 12 mm, for example. The crown main grooves 3 configured as such maintain rigidity of land regions high while ensuring the drainage performance, therefore, excellent steering stability is exerted.

The "tread width TW" is a distance in the tire axial direction between tread ground contact edges (Te), which are defined as outermost ground contacting positions in the tire axial direction, when the tire 1 in a standard state is in contact with a flat surface with zero camber angle by being loaded with a standard tire load. The standard state is a state in which the tire 1 is mounted on a standard rim (not shown) and inflated to a standard pressure with no tire load. Sizes and the like of various parts of the tire in this specification are those measured in the standard state unless otherwise noted.

The "standard rim" is a wheel rim specified for the concerned tire by a standard included in a standardization system on which the tire is based, for example, the "normal wheel rim" in JATMA, "Design Rim" in TRA, and "Measuring Rim" in ETRTO.

The "standard pressure" is air pressure specified for the concerned tire by a standard included in a standardization system on which the tire is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO. If the tire is for a passenger car, the standard pressure is 180 kPa without exception.

The "standard load" is a tire load specified for the concerned tire by a standard included in a standardization system on which the tire is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO. If the tire is for a passenger car, the standard load is 88% of the above loads.

Each of the shoulder regions 4 is provided with a plurality of lateral grooves 6. The lateral grooves 6 in this embodiment include first lateral grooves 7, second lateral grooves 8, and third lateral grooves 9.

The first lateral grooves 7, the second lateral grooves 8, and the third lateral grooves 9 in this embodiment extend in an arc shape. Further, each of the first lateral grooves 7, the second lateral grooves 8, and the third lateral grooves 9 has a center thereof on one side (lower side in the Figs) in the tire circumferential direction and is formed in an arc shape protruding toward the other side (upper side in the figures) in the tire circumferential direction. Thereby, lengths of portions of the land regions between the lateral grooves 7, 8, and 9 are secured, therefore, the rigidity of the land regions is maintained. Note that the first lateral grooves 7, the second lateral grooves 8, and the third lateral grooves 9 are not limited to such configurations.

Each of the first lateral grooves 7 in this embodiment has an axially inner end (7i) positioned axially outside one of the crown main grooves 3 with a space therebetween and an axially outer end (7e) positioned axially outside one of the tread edges (Te). Thereby, it is possible that the first lateral grooves 7 efficiently discharge water film between the tread surface and a road surface toward the outside from the tread edges (Te). Further, the inner end 7i of the first lateral groove 7 is spaced away from the crown main groove 3, therefore, an acute-angled corner portion (not shown) is not formed between the first lateral groove 7 and the crown main groove 3. Thereby, during tire vulcanization, accumulation of rubber is suppressed, therefore, the steering stability is maintained high.

If the inner end (7i) is greatly spaced away from the crown main groove 3, a length of the first lateral groove 7 is decreased, therefore, it is possible that the drainage performance is deteriorated. Thereby, it is preferred that a distance (A) between the inner end (7i) of the first lateral groove 7 and the crown main groove 3 is in a range of from 15% to 35% of widths (Ws) in the tire axial direction of the shoulder regions 4, for example.

Each of the first lateral grooves 7 in this embodiment comprises an inner portion 11 including the inner end (7i) and an outer portion 12 including the outer end (7e).

Figure 2:
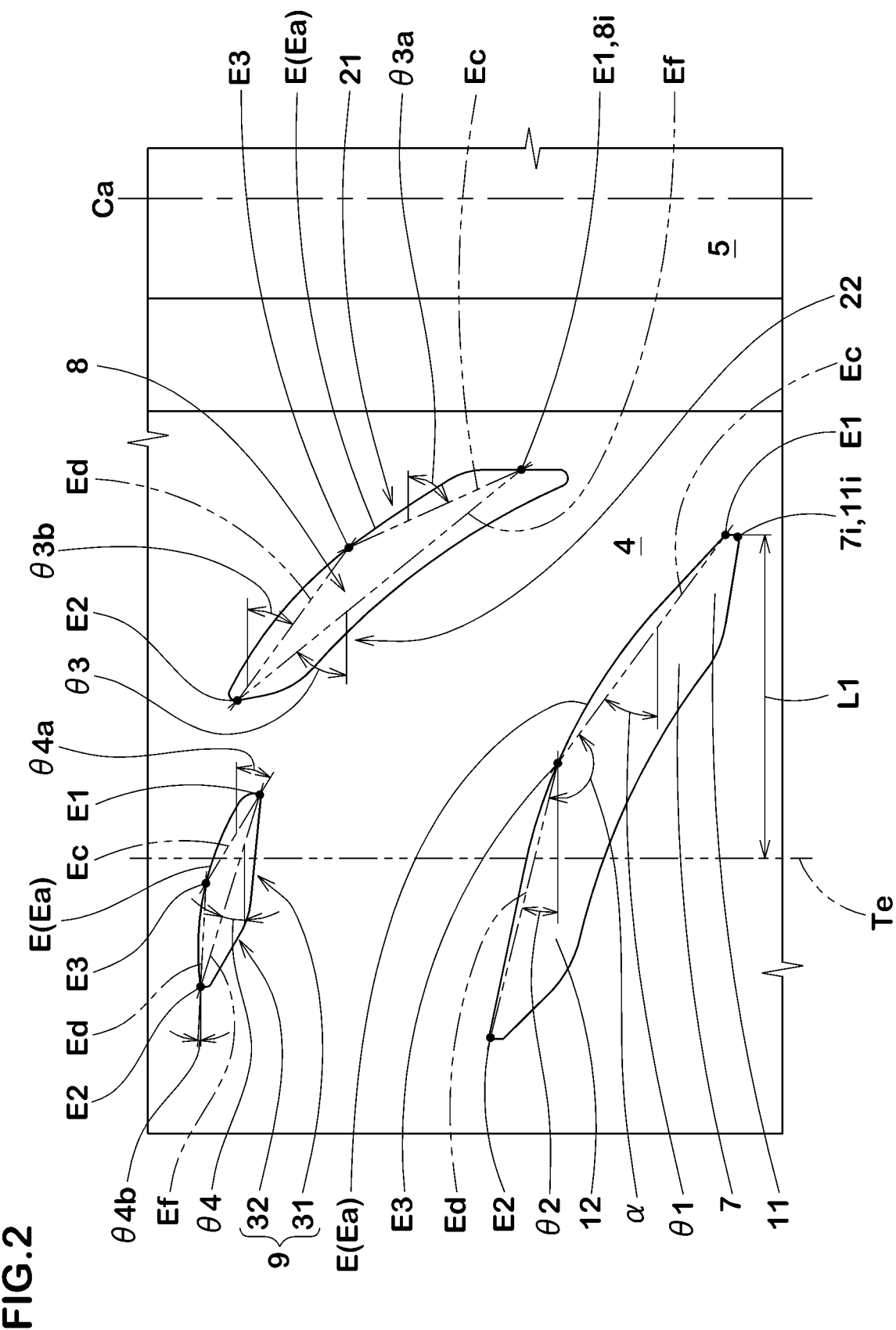
FIG. 2 is an enlarged view of lateral grooves of FIG. 1.

As shown in FIG. 2, the inner portion 11 extends axially outwardly from the inner end (7i) and obliquely at an angle $\theta 1$ with respect to the tire axial direction. The outer portion 12 extends obliquely at an angle $\theta 2$ smaller than the angle $\theta 1$ an with respect to the tire axial direction so as to cross one of the tread edges (Te). The outer portion 12 configured as such can smoothly discharge water in the first lateral groove 7 by using large lateral force during cornering, therefore, the drainage performance is greatly improved. Further, it is possible that the inner portion 11 largely maintains rigidity in the tire circumferential direction of an axially inner part of the shoulder region 4 to which large ground contact pressure is applied.

In this specification, the angle $\theta 1$ of the inner portion 11 of the first lateral grooves 7 and the angle $\theta 2$ of the outer portion 12 of the first lateral grooves 7 are defined as follows. First, in a groove edge (E) of the first lateral grooves 7, a groove edge minute portion (Ea) which extends continuously with the direction of the arc facing toward one side with respect to the tire circumferential direction and has a maximum length in the tire axial direction is specified. The angle θ1 of the inner portion 11 is an angle with respect to the tire axial direction of an imaginary line (Ec) obtained by connecting with a straight line between an axially inner end E1 of the groove edge (Ea) and a center position E3 of a length of the groove edge (Ea). Further, the angle θ2 of the outer portion 12 is an angle with respect to the tire axial direction of an imaginary line (Ed) obtained by connecting with a straight line between an axially outer end E2 of the groove edge (Ea) and the center position E3 of the length of the groove edge (Ea).

It is preferred that the angle θ1 of the inner portion 11 is in a range of from 25 to 45 degrees. It is preferred that the angle θ2 of the outer portion 12 is in a range of from 15 to 40 degrees. If the angle θ1 of the inner portion 11 is smaller than 25 degrees or the angle θ2 of the outer portion 12 is smaller than 15 degrees, groove volume of the first lateral groove 7 becomes small, therefore, it is possible that the drainage performance is deteriorated. If the angle θ1 of the inner portion 11 is larger than 45 degrees or the angle θ2 of the outer portion 12 is larger than 40 degrees, it is possible that water in the first lateral groove 7 cannot be discharged smoothly from the tread edge (Te) by using the lateral force during cornering.

It is preferred that an angle α between the inner portion 11 and the outer portion 12 is in a range of from 160 to 170 degrees. If the angle α is smaller than 160 degrees, an acute-angled corner portion is likely to be formed in a region between the inner portion 11 and the outer portion 12, thus rubber is accumulated during tire vulcanization, therefore, it is possible that the steering stability is deteriorated. If the angle α is larger than 170 degrees, the first lateral grooves 7 become straight and an actual length thereof in a longitudinal direction thereof becomes small, therefore, it is possible that the drainage performance is deteriorated. In the present specification, the angle α is defined as an angle between the imaginary line (Ec) and the imaginary line (Ed).

As shown in FIG. 1, it is preferred that an axial length L1 at the tread surface of the first lateral groove 7 in a part thereof between the tread edges (Te) is larger than an axial length L2 at the tread surface of the second lateral groove 8. The first lateral grooves 7 configured as such can exert large drainage performance.

Each of the second lateral grooves 8 in this embodiment is provided between a pair of the first lateral grooves 7 adjacent to each other in the tire circumferential direction. That is, the second lateral grooves 8 and the first lateral grooves 7 in this embodiment are arranged alternately in the tire circumferential direction.

Each of the second lateral grooves 8 has an axially inner end (8i) positioned in one of the shoulder regions 4 and an axially outer end (8e) positioned in the same shoulder region 4. Each of the second lateral grooves 8 extends axially outwardly from the inner end (8i) and obliquely in the same direction as the first lateral grooves 7. Thereby, rigidity difference in the tire circumferential direction between the first lateral groove 7 and the second lateral groove 8 becomes small, therefore, the steering stability is improved.

The inner end (8i) of the second lateral groove 8 is spaced outward from one of the crown main grooves 3 adjacent thereto in the tire axial direction. Therefore, an acute-angled corner portion is not formed between the second lateral groove 8 and the crown main groove 3. Thereby, the accumulation of rubber is suppressed during tire vulcanization, therefore, the steering stability is maintained high.

It is preferred that a distance (B) in the tire axial direction between the inner end (8i) of one of the second lateral grooves 8 and one of the crown main groove 3 adjacent thereto is smaller than the distance (A) in the tire axial direction between the inner end (7i) of one of the first lateral grooves 7 and one of the crown main grooves 3 adjacent thereto. The outer ends (8e) of the second lateral grooves 8 are arranged in the shoulder regions 4, but the outer ends (7e) of the first lateral grooves 7 are arranged outside the tread edges (Te), therefore, the lengths L2 in the tire axial direction of the second lateral grooves 8 tend to be smaller than those of the first lateral grooves 7. Therefore, by making the distance (B) smaller than the distance (A), the length L2 in the tire axial direction of the second lateral groove 8 is secured large, thereby, the drainage performance is improved. If the distance (B) is excessively smaller than the distance (A), rigidity of the land region between the crown main groove 3 and the second lateral groove 8 becomes small, therefore, it is possible that rubber tends to accumulate during tire vulcanization. Thereby, it is preferred that the distance (B) is in a range of from 35% to 65% of the distance (A).

As shown in FIG. 2, the second lateral groove 8 in this embodiment comprises an inner portion 21 including the inner end (8i) in the tire axial direction and an outer portion 22 including the outer end (8e) in the tire axial direction. The inner portion 21 of the second lateral groove 8 in this embodiment extends axially outwardly from the inner end (8i) and obliquely at an angle (θ3a) with respect to the tire axial direction. The outer portion 22 of the second lateral groove 8 in this embodiment is inclined at an angle (θ3b) smaller than the angle (θ3a) of the inner portion 21 with respect to the tire axial direction.

In this specification, as in the first lateral groove 7, the angle (θ3a) of the inner portion 21 and the angle (θ3b) of the outer portion 22 of the second lateral groove 8 are defined by using the inner end E1, the center position E3, and the outer end E2 of the groove edge minute portion (Ea) of a maximum length of the groove edge (E) of the second lateral groove 8.

If the length in the tire axial direction of the lateral groove is less than 60% of the widths (Ws) in the tire axial direction of the shoulder regions 4, the ground contact pressure and the lateral force during cornering applied to the lateral groove are not very different between the inner portion and the outer portion thereof. Thereby, in such a lateral groove, it is preferred that an inclination angle thereof is specified by the entire lateral groove, i.e. the inner portion and the outer portion combined together. The inclination angle of the entire lateral groove is defined by an imaginary line (Ef) obtained by connecting with a straight line between the inner end E1 and the outer end E2 of the groove edge minute portion (Ea) having the maximum length thereof in the tire axial direction. The length L2 in the tire axial direction of the second lateral groove 8 in this embodiment is smaller than 60% of the widths (Ws) in the tire axial direction of the shoulder regions 4. Thereby, the inclination angle of the second lateral groove 8 is defined by an angle θ3 with respect to the tire axial direction of the imaginary line (Ef) connecting with a straight line between the inner end E1 and the outer end E2 of the groove edge minute portion (Ea).

It is preferred that the angle θ3 of the second lateral groove 8 is larger than the angle θ1 of the inner portion 11. The inner end (8i) of the second lateral groove 8 is arranged closer to the crown main groove 3 than the inner end (7i) of the first lateral groove 7, that is, an inner end (11i) of the inner portion 11. Thereby, larger ground contact pressure is applied to the inner end (8i) of the second lateral groove 8 than the inner end (11i) of the inner portion 11. Therefore, by setting the angles θ3 of the second lateral grooves 8 larger than the angles θ1 of the inner portions 11, rigidity in the tire circumferential direction of the land portion around the second lateral grooves 8 is secured large, therefore, excellent steering stability is exerted.

It is preferred that the angles θ3 of the second lateral grooves 8 are in a range of from 30 to 50 degrees. If the angles θ3 of the second lateral grooves 8 are smaller than 30 degrees, actual lengths of the second lateral grooves 8 cannot be increased in parts thereof on sides of the tire equator (Ca) in which water film between the tread surface thereof and a road surface is difficult to discharge, therefore, it is possible that the drainage performance is deteriorated. If the angles θ3 of the second lateral grooves 8 are larger than 50 degrees, the lengths L2 in the tire axial direction of the second lateral grooves 8 become small, therefore, the water film can not be effectively collected, thereby, it is possible that the drainage performance is rather deteriorated.

As shown in FIG. 1, the lengths L2 in the tire axial direction at the tread surfaces of the second lateral grooves 8 are, for example, in a range of from 40% to 58% of the widths (Ws) in the tire axial direction of the shoulder regions 4. Thereby, the drainage performance and the steering stability are improved in a good balance.

The second lateral groove 8 has an overlapping portion (8a) overlapping in the tire circumferential direction when viewed in the tire axial direction with either one of the first lateral grooves 7 adjacent in the tire circumferential direction. Thereby, further excellent drainage performance is exerted.

Each of the third lateral grooves 9 is disposed between a pair of the first lateral grooves 7 adjacent to each other in the tire circumferential direction. The third lateral grooves 9 in this embodiment are inclined to the same directions as the first lateral grooves 7. The third lateral grooves 9 and the first lateral grooves 7 in this embodiment are arranged alternately in the tire circumferential direction.

Each of the third lateral grooves 9 comprises an inner end (9i) in the tire axial direction and an outer end (9e) in the tire axial direction. The third lateral groove 9 in this embodiment extends from the inner end (9i) so as to cross one of the tread edges (Te). Thereby, the outer ends (9e) of the third lateral grooves 9 in this embodiment are positioned axially outside the tread edges (Te). The third lateral grooves 9 configured as such also smoothly discharge water in the third lateral grooves 9 toward the outside of the tread edges (Te), therefore, the drainage performance is improved.

The inner end (9i) of the third lateral groove 9 is positioned axially outside the second lateral groove 8 with a space therebetween. The inner end (9i) in this embodiment is positioned axially outside the outer end (8e) of the second lateral groove 8. Thereby, rigidity of parts of the shoulder regions 4 between the first lateral grooves 7 is secured large, therefore, the steering stability is maintained high.

It is preferred that a distance (C) in the tire axial direction between the inner end (9i) of the third lateral groove 9 and the outer end (8e) of the second lateral groove 8 is in a range of from 5% to 12.5% of the tread width TW. If the distance (C) is smaller than 5% of the tread width TW, rigidity becomes small in a part of the land region on a side of the tread edge (Te) to which large lateral force is applied during cornering, therefore, it is possible that the steering stability is deteriorated. If the distance (C) is larger than 12.5% of the tread width TW, an axial length L3 at the tread surface between the tread edges (Te) of the third lateral groove 9 or the length L2 in the tire axial direction of the second lateral groove 8 becomes small, therefore, it is possible that the drainage performance is deteriorated.

It is preferred that the distance (C) is larger than the distance (B). Thereby, rigidity can be maintained high in parts of the land region on sides of the tread edges (Te) to which large lateral force is applied during cornering, therefore, the steering stability is improved. If the distance (C) is smaller than the distance (B), that is, if the distance (B) is larger than the distance (C), it is possible that the water film is not effectively discharged at the tread surface of an axially inner part of the land region in which water is difficult to be discharged. If the distance (C) is excessively larger than the distance (B), it is possible that the water film is not discharged smoothly at the tread surface of an axially outer part of the land region. It is preferred that the distance (C) is in a range of from 1.2 to 1.8 times the distance (B).

In order to effectively exert the above described effects, it is preferred that the distance (C) is larger than the length L3 in the tire axial direction of the third lateral groove 9. It is further preferred that the distance (C) is in a range of from 1.1 to 1.7 times the length L3 of the third lateral groove 9.

The length L3 in the tire axial direction at the tread surface of the third lateral groove 9 is smaller than the length L2 of the second lateral groove 8. That is, the third lateral grooves 9 having smaller axial lengths are arranged closer to the tread edges (Te) than the second lateral grooves 8. Thereby, rigidity is maintained high in parts of the land regions of the shoulder regions 4 on sides of the tread edges (Te) to which larger lateral force is applied during cornering, therefore, the steering stability is improved. From this viewpoint, it is preferred that the lengths L3 of the third lateral grooves 9 are in a range of from 20% to 30% of the lengths L2 of the second lateral grooves 8.

It is preferred that a distance (D) in the tire circumferential direction between the inner end (9i) of the third lateral groove 9 and the outer end (8e) of the second lateral groove 8 is in a range of from 4% to 12% of a length (Lb) in the tire circumferential direction of the second lateral groove 8. If the distance (D) is smaller than 4% of the length (Lb) of the second lateral groove 8, rigidity of the land region between the third lateral groove 9 and the second lateral groove 8 becomes small, therefore, it is possible that the steering stability is deteriorated. If the distance (D) is larger than 12% of the length (Lb) of the second lateral groove 8, the first lateral groove 7 and the third lateral groove 9 are arranged closed to each other, therefore, it is possible that rigidity in the tire axial direction of the land region between the first lateral groove 7 and the third lateral groove 9 becomes small.

In order to improve the drainage performance and the steering stability in a good balance, it is preferred that the lengths L3 in the tire axial direction of the third lateral grooves 9 are in a range of from 5% to 25% of the widths (Ws) in the tire axial direction of the shoulder regions 4.

As shown in FIG. 2, each of the third lateral grooves 9 in this embodiment comprises an inner portion 31 including the inner end (9i) in the tire axial direction and an outer portion 32 including the outer end (9e) in the tire axial direction. The inner portion 31 of the third lateral groove 9 in this embodiment extends axially outwardly from the inner end (9i) and obliquely at an angle (θ4a) with respect to the tire axial direction. The outer portion 32 of the third lateral grooves 9 in this embodiment is inclined at an angle (θ4b) smaller than the angle (θ4a) of the inner portion 31 with respect to the tire axial direction. Similarly to the first lateral grooves 7, the angle (θ4a) of the inner portion 31 and the angle (θ4b) of the outer portion 32 of the third lateral groove 9 are defined by using the inner end E1, the center position E3, and the outer end E2 of the groove edge minute portion (Ea) having the maximum length of the groove edge (E) of the third lateral groove 9.

It is preferred that the lengths L3 (shown in FIG. 1) in the tire axial direction at the tread surfaces of the third lateral grooves 9 in this embodiment are smaller than 60% of the widths (Ws) in the tire axial direction of the shoulder regions 4. An inclination angle θ4 of the third lateral groove 9 with respect to the tire axial direction is defined by the imaginary line (Ef) obtained by connecting with a straight line between the inner end E1 and the outer end E2 of the groove edge minute portion (Ea).

It is preferred that the angle θ4 with respect to the tire axial direction of the third lateral groove 9 is smaller than the angle θ2 of the outer portion 12 of the first lateral groove 7. Thereby, the third lateral groove 9 and the outer portion 12 have edge components of different angles, therefore, the drainage performance is effectively improved. From this point of view, it is preferred that the angles θ4 of the third lateral grooves 9 are not greater than 25 degrees. In this embodiment, the angles θ4 of the third lateral grooves 9 are the smallest among the angles of the lateral grooves 6. In this embodiment, the angles θ3 of the second lateral grooves 8 are the largest among the angles of the lateral grooves 6.

It is preferred that the angles θ4 with respect to the tire axial direction of the third lateral grooves 9 are smaller than the angles θ3 with respect to the tire axial direction of the second lateral grooves 8. Thereby, the rigidity in the tire circumferential direction of the land regions on the sides of the tread edges (Te) is maintained high, therefore, the steering stability is further improved. Furthermore, water in the third lateral grooves 9 is smoothly discharged by using the lateral force during cornering. From this point of view, it is preferred that the angles θ4 of the third lateral grooves 9 are not greater than 25 degrees.

Figure 3:
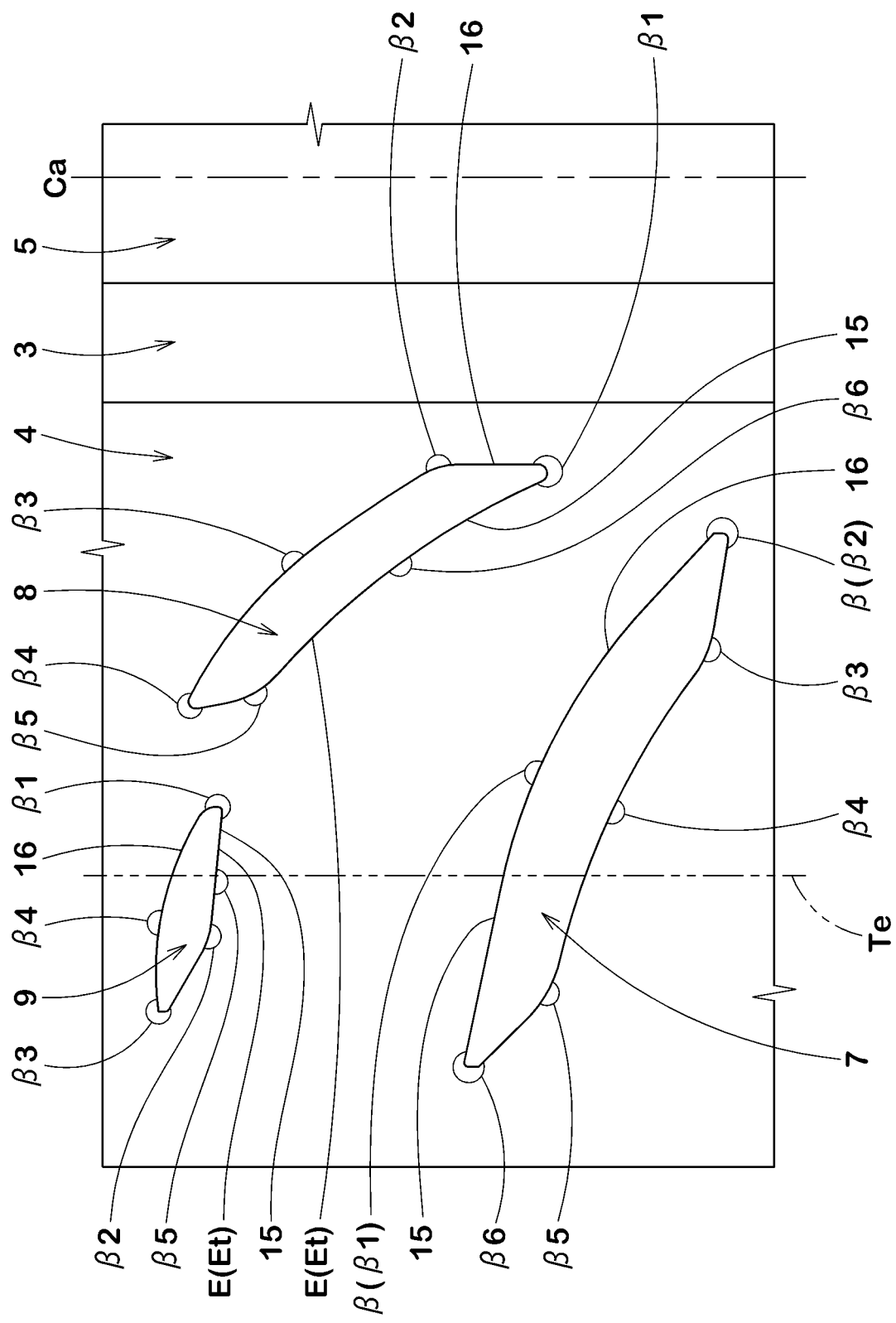
FIG. 3 is an enlarged view of the lateral grooves of FIG. 1.

As shown in FIG. 3, in this embodiment, it is preferred that the groove edge (E) of each of the first lateral grooves 7, the second lateral grooves 8, and the third lateral grooves 9 of the lateral grooves 6 are defined as follows. The groove edge (E) of each of the first lateral grooves 7 includes a plurality of groove edge minute portions 15, 16, . . . (the reference number continues) which are inclined at different angles with respect to the tire axial direction. It is preferred that angles β1, β2, β3, β4, . . . (the reference sign continues) formed between any adjacent ones of the groove edge minute portions 15, 16, . . . (the reference number continues) provided in the first lateral grooves 7 are all not smaller than 90 degrees in a plan view of the tread surface. In other words, the land region surrounding each of the first lateral grooves 7 is defined by the groove edge minute portions 15, 16, . . . (the reference number continues) having the angles β1, β2, . . . (the reference sign continues) not smaller than 90 degrees between their respective adjacent groove edges 15, 16, . . . (the reference number continues) of the first lateral grooves 7 so that the surrounding land region does not have an acute-angled corner portion having an angle smaller than 90 degrees. Thereby, the accumulation of rubber during tire vulcanization is suppressed in the land region surrounding the first lateral grooves 7, therefore, excellent steering stability is exerted. As with the first lateral grooves 7, it is preferred that the angles β31, β32, β33, β34, . . . (the reference sign continues) formed between any adjacent ones of the groove edge minute portions 15, 16, . . . (the reference number continues) of the groove edges (E) of the second lateral grooves 8 and the third lateral grooves 9 are all not smaller than 90 degrees in a plan view of the tread surface.

The above-described effect is exerted especially at groove edge minute portions of groove edges (Et) at the tread surface.

As shown in FIG. 1, it is preferred that a groove width W2 of each of the first lateral grooves 7 is larger than a groove width W3 of each of the second lateral grooves 8 at the tread surface. It is preferred that the groove width W3 of each of the first lateral grooves 7 is larger than a groove width W4 of each of the third lateral grooves 9 at the tread surface. It is preferred that the groove widths W2 of the first lateral grooves 7 are in a range of from 60% to 80% of the widths W1 of the crown main grooves 3, for example. It is preferred that the groove widths W3 of the second lateral grooves 8 are in a range of from 50% to 70% of the widths W1 of the crown main grooves 3, for example. It is preferred that the groove widths W4 of the third lateral grooves 9 are in a range of from 30% to 50% of the widths W1 of the crown main grooves 3, for example. Each of the groove widths W2 of the first lateral grooves 7, the groove widths W3 of the second lateral grooves 8, and the groove widths W4 of the third lateral grooves 9 is defined as a maximum width of the respective lateral groove in a direction perpendicular to a longitudinal direction thereof.

As shown in FIG. 1, the crown region 5 in this embodiment is formed as a plain rib in which no grooves or sipes are provided. Although not particularly limited, in order to increase rigidity of the land region of the crown region 5 and improve straight running stability, it is preferred that a width (Wc) in the tire axial direction of the crown region 5 is in a range of from 10% to 20% of the tread width TW.

While detailed description has been made of the tire as an embodiment of the present invention, it is needless to say that the present invention can be embodied in various forms without being limited to the illustrated embodiment.

WORKING EXAMPLE (EXAMPLE)

Tires of size 245/40R18 having the basic pattern shown in FIG. 1 were made by way of test according to common specifications (A) and the specifications listed in Table 1, then each of the test tires was tested for the drainage performance and the steering stability. Further, tires of size 245/40R18 having the basic pattern shown in FIG. 1 were made by way of test according to common specifications (B) and the specifications listed in Table 2, then each of the test tires was tested for the drainage performance and the steering stability.

In each of references and examples, the groove widths and the groove depths are adjusted so that the land ratios and the groove volumes in the shoulder regions and the crown region are the same with each other.

Each of the references and the examples satisfies the following expressions:
the widths W1 of the crown main grooves>the groove widths W2 of the first lateral grooves>the groove widths W3 of the second lateral grooves>the groove widths W4 of the third lateral grooves.
<Common Specifications (A)>
The angle θ2 of the outer portion: 21 degrees (except for the angle θ2 of Example 7: 15 degrees)
The distance (A)/the widths (Ws) of the shoulder regions: 25%

<Common Specifications (B)>

Each of the references and the examples satisfies the following expressions:

the widths W1 of the crown main grooves>the groove widths W2 of the first lateral grooves>the groove widths W3 of the second lateral grooves>the groove widths W4 of the third lateral grooves.

The distance (A)/the widths (Ws) of the shoulder regions 4: 20%

The length L3 of the third lateral grooves/the widths (Ws) of the shoulder regions: 12.5%

The angle α in Conventional Example 2 is an angle of an oblique groove (b2).

Test methods are as follows.

<Steering Stability and Drainage Performance>

The test tires were mounted on all wheels of a test car under the following conditions. Then the test driver drove the test car on a dry asphalt road surface and a wet road surface with puddle having depth of 3 mm of a test course, and traction performance and running characteristics related to cornering performance were evaluated by the driver's feeling. The test results are indicated by an evaluation point based on Conventional Examples 1 and 2 being 100, wherein larger numerical value is better.

Test car: 4WD-car with displacement of 2000 cc
Tire pressure: 230 kPa

The results of the test according to the common specification (A) are shown in Table 1. The results of the test according to the common specification (B) are shown in Table 2.

TABLE 1

Figure 4:
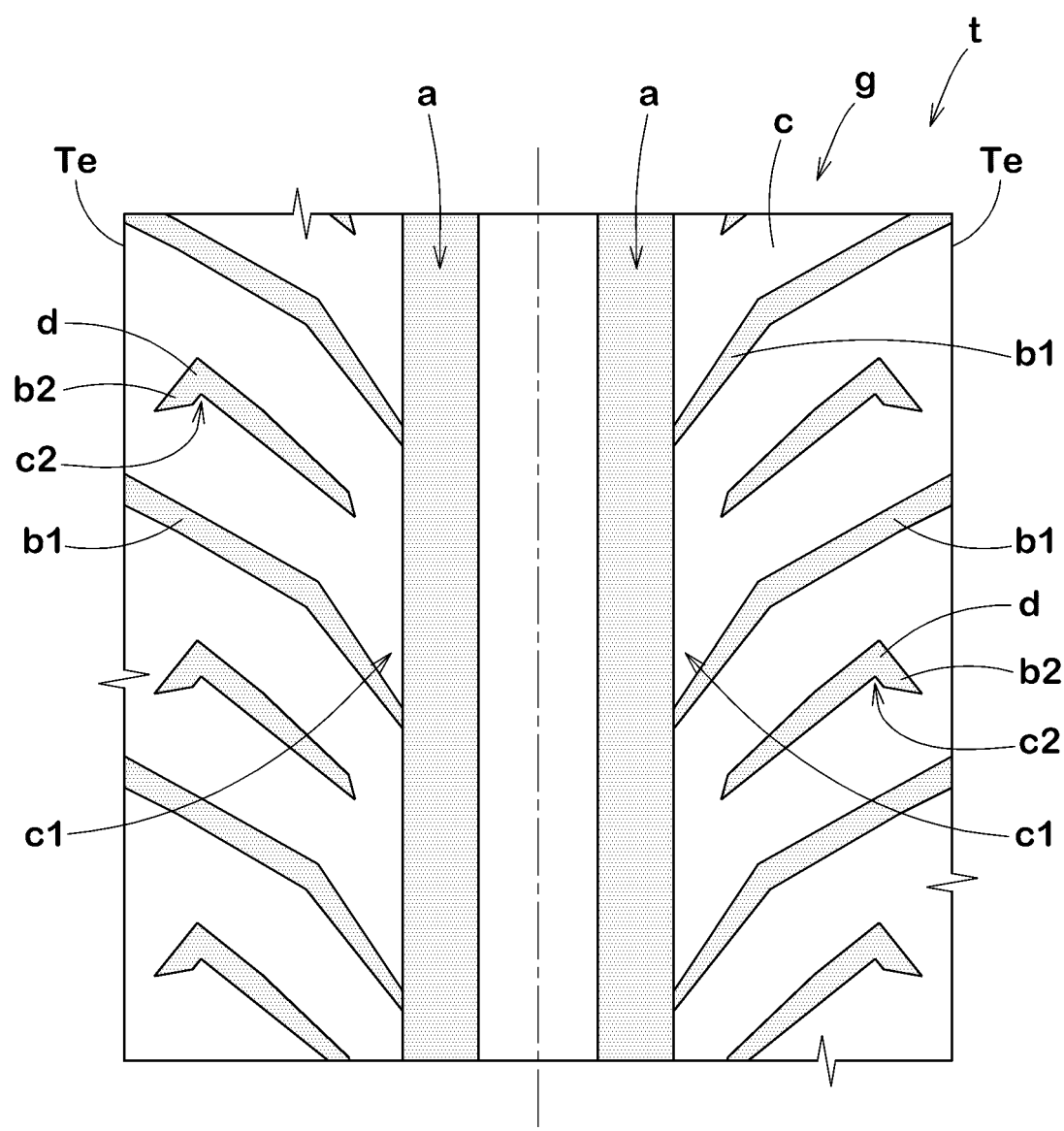
FIG. 4 is a development view of a tread portion showing an embodiment of a conventional example.

|  | Conv. Ex. 1 | Ex. 1 | Ref. 1 | Ex. 2 | Ex. 3 | Ex. 4 | Ex. 5 | Ref. 2 | Ref. 3 | Ref. 4 |
|---|---|---|---|---|---|---|---|---|---|---|
| FIG. showing shape of Tread portion | FIG. 4 | FIG. 1 | FIG. 1 | FIG. 1 | FIG. 1 | FIG. 1 | FIG. 1 | FIG. 1 | FIG. 1 | FIG. 1 |
| Distance (B)/Distance (A) [%] | — | 53 | 100 | 30 | 35 | 65 | 70 | 53 | 53 | 53 |
| Angle θ1 [degrees] | 32 | 32 | 32 | 32 | 32 | 32 | 32 | 21 | 32 | 47 |
| Angle θ3 [degrees] | — | 47 | 47 | 47 | 47 | 47 | 47 | 47 | 32 | 47 |
| Angle θ4 [degrees] | — | 15 | 15 | 15 | 15 | 15 | 15 | 15 | 15 | 15 |
| Distance (C)/Tread width TW [%] | — | 7.5 | 7.5 | 7.5 | 7.5 | 7.5 | 7.5 | 7.5 | 7.5 | 7.5 |
| Width (Wc) of Crown region/Tread width TW [%] | 15 | 15 | 15 | 15 | 15 | 15 | 15 | 15 | 15 | 15 |
| Drainage performance [evaluation point: larger is better] | 100 | 110 | 90 | 113 | 112 | 108 | 104 | 103 | 104 | 102 |
| Steering stability [evaluation point: larger is better] | 100 | 110 | 114 | 104 | 107 | 111 | 113 | 103 | 102 | 104 |

|  | Ex. 6 | Ex. 7 | Ex. 8 | Ex. 9 | Ex. 10 | Ex. 11 | Ex. 12 | Ex. 13 | Ex. 14 | Ex. 15 |
|---|---|---|---|---|---|---|---|---|---|---|
| FIG. showing shape of Tread portion | FIG. 1 | FIG. 1 | FIG. 1 | FIG. 1 | FIG. 1 | FIG. 1 | FIG. 1 | FIG. 1 | FIG. 1 | FIG. 1 |
| Distance (B)/Distance (A) [%] | 53 | 53 | 53 | 53 | 53 | 53 | 53 | 53 | 53 | 53 |
| Angle θ1 [degrees] | 32 | 32 | 32 | 32 | 32 | 32 | 32 | 32 | 32 | 32 |
| Angle θ3 [degrees] | 47 | 47 | 21 | 21 | 21 | 21 | 21 | 21 | 21 | 21 |
| Angle θ4 [degrees] | 21 | 15 | 15 | 15 | 15 | 15 | 15 | 15 | 15 | 15 |
| Distance (C)/Tread width TW [%] | 7.5 | 7.5 | 3 | 5 | 12.5 | 15 | 7.5 | 7.5 | 7.5 | 7.5 |
| Width (Wc) of Crown region/Tread width TW [%] | 15 | 15 | 15 | 15 | 15 | 15 | 5 | 10 | 20 | 25 |
| Drainage performance [evaluation point: larger is better] | 106 | 109 | 112 | 111 | 108 | 105 | 109 | 110 | 108 | 107 |
| Steering stability [evaluation point: larger is better] | 108 | 105 | 105 | 108 | 111 | 112 | 107 | 108 | 110 | 109 |

TABLE 2

|  | Conv. Ex. 2 | Ex. 16 | Ref. 5 | Ex. 17 | Ex. 18 | Ex. 19 | Ex. 20 | Ref. 6 |
|---|---|---|---|---|---|---|---|---|
| FIG. showing shape of Tread portion | FIG. 4 | FIG. 1 | FIG. 1 | FIG. 1 | FIG. 1 | FIG. 1 | FIG. 1 | FIG. 1 |
| Length L3 of Third lateral groove/Length L2 of Second lateral groove [%] | — | 25 | 100 | 18 | 20 | 30 | 32 | 25 |
| Angle θ1 [degrees] | — | 34 | 34 | 34 | 34 | 34 | 34 | 34 |
| Angle θ2 [degrees] | — | 16 | 16 | 16 | 16 | 16 | 16 | 34 |
| Distance (B)/Distance (A) [%] | — | 53 | 53 | 53 | 53 | 53 | 53 | 53 |
| Angle α [degrees] | 90 | 162 | 162 | 162 | 162 | 162 | 162 | 180 |

TABLE 2-continued

|  | | | | | | | |
|---|---|---|---|---|---|---|---|
| Drainage performance [evaluation point: larger is better] | 100 | 110 | 80 | 115 | 113 | 107 | 105 | 90 |
| Steering stability [evaluation point: larger is better] | 100 | 120 | 125 | 110 | 115 | 122 | 123 | 115 |

|  | Ref. 7 | Ex. 21 | Ex. 22 | Ex. 23 | Ex. 24 | Ex. 25 | Ex. 26 | Ex. 27 |
|---|---|---|---|---|---|---|---|---|
| FIG. showing shape of Tread portion | FIG. 1 | FIG. 1 | FIG. 1 | FIG. 1 | FIG. 1 | FIG. 1 | FIG. 1 | FIG. 1 |
| Length L3 of Third lateral groove/Length L2 of Second lateral groove [%] | 25 | 25 | 25 | 25 | 25 | 25 | 25 | 25 |
| Angle θ1 [degrees] | 21 | 34 | 34 | 34 | 34 | 40 | 40 | 34 |
| Angle θ2 [degrees] | 21 | 16 | 16 | 16 | 16 | 15 | 20 | 24 |
| Distance (B)/Distance (A) [%] | 53 | 30 | 35 | 65 | 70 | 15 | 15 | 15 |
| Angle α [degrees] | 180 | 162 | 162 | 162 | 162 | 155 | 160 | 170 |
| Drainage performance [evaluation point: larger is better] | 90 | 112 | 111 | 107 | 105 | 104 | 108 | 104 |
| Steering stability [evaluation point: larger is better] | 113 | 115 | 118 | 121 | 122 | 115 | 118 | 121 |

From the test results, it can be confirmed that in each of the common specifications (A) and the common specifications (B), the performances of the tires as the examples were improved in a good balance as compared with the tires as the conventional examples. Further, tires having different size were also tested, and the results were the same.

The invention claimed is:

1. A tire comprising:
a tread portion that has tread edges and that comprises a pair of crown main grooves extending continuously in a tire circumferential direction, a pair of shoulder regions defined as regions of the tread portion positioned axially outside the respective crown main grooves, and a plurality of lateral grooves provided in the shoulder regions, wherein
the lateral grooves include a plurality of first lateral grooves, a plurality of second lateral grooves, and a plurality of third lateral grooves,
each of the first lateral grooves has an inner end arranged axially outside one of the adjacent crown main grooves with a space therebetween, and comprises an inner portion extending axially outwardly from the inner end and obliquely at an angle θ1 with respect to the tire axial direction, and an outer portion extending obliquely at an angle θ2 smaller than the angle θ1 with respect to the tire axial direction so as to cross one of the adjacent tread edges, wherein the angle θ1 of the inner portion is in a range of 25 to 45 degrees,
each of the second lateral grooves is arranged between the circumferentially adjacent first lateral grooves with an inner end thereof arranged axially outside the adjacent one of the crown main grooves and extends axially and obliquely in the same direction as the first lateral groove so as to terminate without reaching the adjacent one of the tread edges,
the second lateral groove is inclined at an angle θ3 with respect to the tire axial direction larger than the angle θ1 with respect to the tire axial direction,
each of the third lateral grooves has a smaller axial length at the tread surface than that of the second lateral groove, and
each of the third lateral grooves is arranged between the circumferentially adjacent first lateral grooves with an inner end thereof arranged axially outside the second lateral groove adjacent thereto with a distance (C) therebetween and extends in the tire axial direction so as to cross one of the adjacent tread edges.

2. The tire according to claim 1, wherein a distance (A) in the tire axial direction between the inner end of the first lateral groove and the adjacent one of the crown main grooves is in a range of 15% to 35% of a width of either one of the shoulder regions in the tire axial direction.

3. The tire according to claim 1, wherein the inner end of the second lateral groove is positioned axially outside the adjacent one of the crown main grooves with an axial distance (B) smaller than the axial distance (A) between the inner end of the first lateral groove and the adjacent one of the crown main grooves.

4. The tire according to claim 1, wherein the first lateral groove has a larger axial length at a tread surface than that of the second lateral groove.

5. The tire according to claim 1, wherein a length in the tire axial direction of the second lateral groove at a tread surface is in a range of 40% to 58% of the width of either one of the shoulder regions.

6. The tire according to claim 1, wherein the distance (C) is in a range of 10% to 25% of a tread width.

7. The tire according to claim 1, wherein each of the third lateral grooves is inclined to the same direction as the first lateral groove at an angle θ4 smaller than the angle θ2 of the outer portion with respect to the tire axial direction.

8. The tire according to claim 1, wherein the angle θ4 of the third lateral groove with respect to the tire axial direction is smaller than the angle θ3 of the second lateral groove with respect to the tire axial direction.

9. The tire according to claim 8, wherein
the angle θ2 of the outer portion is in a range of 15 to 40 degrees,
the angle θ3 of the second lateral groove is in a range of 30 to 50 degrees, and
the angle θ4 of the third lateral groove is not greater than 25 degrees.

10. The tire according to claim 1, wherein
each of the first lateral grooves, the second lateral grooves, and the third lateral grooves has a groove edge including a plurality of groove edge minute portions, and
in a plan view of the tread surface, an angle between any pair of the groove edge minute portions adjacent to each other is not smaller than 90 degrees.

11. The tire according to claim 1, wherein
the tread portion further comprises a crown land region defined between the pair of the crown main grooves, and
a width in the tire axial direction of the crown land region is in a range of from 10% to 20% of a tread width.

12. The tire according to claim 1, wherein an angle between the inner portion and the outer portion of each of the first lateral grooves is in a range of 160 to 170 degrees.

13. The tire according to claim 1, wherein the pair of shoulder regions is not provided with any grooves that are connected to the pair of crown main grooves.

14. The tire according to claim 1, wherein a groove width W3 of each of the first lateral grooves is larger than a groove width W4 of each of the third lateral grooves at the tread surface.

15. A tire comprising:
a tread portion that has tread edges and that comprises a pair of crown main grooves extending continuously in a tire circumferential direction, a pair of shoulder regions defined as regions of the tread portion positioned axially outside the respective crown main grooves, and a plurality of lateral grooves provided in the shoulder regions, wherein
the lateral grooves include a plurality of first lateral grooves and a plurality of second lateral grooves,
each of the first lateral grooves has an inner end arranged axially outside one of the adjacent crown main grooves with a space therebetween, and comprises an inner portion extending axially outwardly from the inner end and obliquely at an angle $\theta 1$ with respect to the tire axial direction, and an outer portion extending obliquely at an angle $\theta 2$ smaller than the angle $\theta 1$ with respect to the tire axial direction so as to cross one of the adjacent tread edges,
each of the second lateral grooves is arranged between the circumferentially adjacent first lateral grooves with an inner end thereof arranged axially outside the adjacent one of the crown main grooves and extends axially and obliquely in the same direction as the first lateral groove so as to terminate without reaching the adjacent one of the tread edges,
each of the shoulder regions is provided with a plurality of third lateral grooves having a smaller axial length at the tread surface than that of the second lateral groove, and
each of the third lateral grooves is arranged between the circumferentially adjacent first lateral grooves with an inner end thereof arranged axially outside an outer end of the second lateral groove adjacent thereto with a distance (C) therebetween and extends in the tire axial direction so as to cross one of the adjacent tread edges.

16. The tire according to claim 15, wherein a distance (D) in the tire circumferential direction between the inner end of the third lateral groove and the outer end of the second lateral groove is in a range of 4% to 12% of a length in the tire circumferential direction of the second lateral groove.

17. The tire according to claim 15, wherein the distance (C) is in a range of 10% to 25% of a tread width.

18. The tire according to claim 15, wherein each of the third lateral grooves is inclined to the same direction as the first lateral groove at an angle $\theta 4$ smaller than the angle $\theta 2$ of the outer portion with respect to the tire axial direction.

19. The tire according to claim 15, wherein the angle $\theta 4$ of the third lateral groove with respect to the tire axial direction is smaller than the angle $\theta 3$ of the second lateral groove with respect to the tire axial direction.

* * * * *